United States Patent [19]
Brady et al.

[11] Patent Number: 5,706,443
[45] Date of Patent: Jan. 6, 1998

[54] METHOD AND APPARATUS FOR ENABLING PIPELINING OF BUFFERED DATA

[75] Inventors: James T. Brady; Damon W. Finney, both of San Jose, Calif.; Michael H. Hartung, Tucson, Ariz.; Donald J. Lang, Cupertino, Calif.; Jaishankar M. Menon, San Jose, Calif.; David R. Nowlen, Morgan Hill, Calif.; Calvin K. Tang, Saratoga, Calif.

[73] Assignee: International Business Machines Corporation, Armonk, N.Y.

[21] Appl. No.: 241,904

[22] Filed: May 11, 1994

[51] Int. Cl.⁶ ................................................. G06F 13/00
[52] U.S. Cl. .................... 365/250; 395/872; 395/853; 395/854; 395/496
[58] Field of Search ................... 395/872, 250, 395/853, 854, 496

[56] References Cited

U.S. PATENT DOCUMENTS

| | | | |
|---|---|---|---|
| 4,258,418 | 3/1981 | Heath | 395/250 |
| 4,860,193 | 8/1989 | Bentley et al. | 395/250 |
| 5,056,010 | 10/1991 | Huang | 364/200 |
| 5,133,078 | 7/1992 | Minassian et al. | 395/800 |
| 5,179,552 | 1/1993 | Chao | 370/60 |
| 5,189,665 | 2/1993 | Niehaus et al. | 370/458.1 |
| 5,210,829 | 5/1993 | Bitner | 395/250 |
| 5,214,760 | 5/1993 | Hammond et al. | 395/250 |
| 5,224,213 | 6/1993 | Dieffenderfer et al. | 395/250 |
| 5,226,040 | 7/1993 | Noble, III et al. | 370/56 |
| 5,235,682 | 8/1993 | Mitsuhira et al. | 395/275 |
| 5,249,271 | 9/1993 | Hopkinson et al. | 395/250 |
| 5,412,780 | 5/1995 | Rushton | 395/250 |

FOREIGN PATENT DOCUMENTS 0 247 317  1/1987  European Pat. Off. .

OTHER PUBLICATIONS

European Search Report—No. EP 95 30 2515—17 Aug. 1995.
Patent Abstracts of Japan—vol. 016, No. 222 (P-1359)—25 May 1992 & JP-A-04044177 (SEIKO INSTR. INC.) 13 Feb. 1992.

*Primary Examiner*—Eddie P. Chan
*Assistant Examiner*—Vincent Yip
*Attorney, Agent, or Firm*—Ohlandt, Greeley, Ruggiero & Perle

[57] ABSTRACT

A system that enables pipelining of data to and from a memory includes multiple control block data structures which indicate amounts of data stored in the memory. An input port device receives and stores in memory, data segments of a received data message and only updates status information in the software control blocks when determined quantities of the data segments are stored. An output port is responsive to a request for transmission of a portion of the received data and to a signal from the input port that at least a first control count of data segments of the received data are present in memory. The output port then outputs the stored data segments from memory but discontinues the action if, before the required portion of the received data is outputted, software control blocks indicate that no further stored data segments are available for outputting. The input port then updates the software control blocks when newly arrived and stored data segments reach a second control count value, the updating occurring irrespective of whether the determined quantity of the received data has been stored in memory.

14 Claims, 6 Drawing Sheets

METHOD AND APPARATUS FOR ENABLING PIPELINING OF BUFFERED DATA

FIELD OF THE INVENTION

This invention relates to data transfers through a buffer and, more particularly, to a method and apparatus for pipelining of data transfers through a buffer so as to minimize delay.

BACKGROUND OF THE INVENTION

Transfers of data through a buffer can cause long delays if a data read from buffer is not commenced until after a data write to buffer has been completed. Such delays can be substantial when long data runs are being transferred and/or when there is more than one buffer for the data to pass through. To reduce such delays, the prior art has commenced a read operation from a buffer before the write operation into the buffer has been completed. The mechanism for allowing simultaneous input and output operations in a buffer is called data transfer pipelining or simply, pipelining.

A known technique for pipelining uses a storage buffer which is addressable in a linear address space by an address pointer. The pipelining mechanism includes both input and output address pointers. These pointers move as data is being transferred into and out of the buffer, concurrently. When the output address pointer equals the input address pointer, no further data is available for transfer from the output port. In such case, the pipelining mechanism either signals an error (if a data overrun is not allowed) or momentarily stops the output data transfer. Thereafter, output data transfers resume as soon as more data is available (i.e. when the address pointers are no longer equal). Generally, when the output data transfer is momentarily stopped, the output data path is not available for use with other data transfers. Furthermore, such pipelining actions are limited to a single buffer.

In U.S. Pat. No. 5,133,078 to Minassian et al., a data buffering system is described which controls data writes and reads in a pair of dual-port input buffers. A first state machine controls the filling of the dual-port input buffers in alternating fashion. A second state machine controls the transfer of bytes from one of the input buffers to one of a pair of output buffers enroute to a control unit. When an input buffer is being filled, after receipt of a predetermined number of bytes, a signal is sent that enables emptying of bytes from the input buffer into the output buffer.

U.S. Pat. No. 5,224,213 to Dieffenderfer et al. describes a ping-pong data buffer which is comprised of a dual-port storage mechanism, with each port having its own separate data, address and control lines. As data is being written into one portion of the buffer via one port, it is simultaneously read from another port. Provision is made to enable the read/write actions to be changed, as between the ports.

Additional buffer control techniques can be found described in the following U.S. Pat. Nos.: 5,056,010 to Huang; 5,226,040 to Noble, III et al.; 5,235,682 to Mitsuhira et al.; 5,214,760 to Hammond et al.; 5,189,665 to Niehaus et al.; and 5,179,552 to Chao.

Modern data processing systems that employ pipelined data transfers generally incur substantial processing overhead to assure synchronization of operations between input and output ports of a buffer. This processing overhead is both costly in terms of expended processing time and delays the availability of data from the buffer, notwithstanding the pipeline action. As the output port from the buffer is restricted to only data being pipelined, other data is queued, and awaits transmission until termination of the current pipeline action.

Accordingly, it is an object of this invention to provide an improved pipelining mechanism which enables substantially asynchronous operations between input and output ports of a buffer.

It is an other object of this invention to provide a pipelining method and apparatus wherein input/output port communications to accomplish the pipelining action are minimized.

It is yet another object of this invention to provide a method and apparatus for pipelining of data transfers wherein multiple buffers are encompassed by the pipeline control mechanism.

It is still another object of this invention to provide an improved method and apparatus for pipelining of buffered data transfers wherein updating of data required to enable the pipelining action is minimized.

SUMMARY OF THE INVENTION

A system that enables pipelining of data to and from a memory includes multiple control block data structures which indicate amounts of data stored in the memory. An input port device receives and stores in memory, data segments of a received data message and only updates status information in the software control blocks when determined quantities of the data segments are stored. An output port is responsive to a request for transmission of a portion of the received data and to a signal from the input port that at least a first control count of data segments of the received data are present in memory. The output port then outputs the stored data segments from memory but discontinues the action if, before the required portion of the received data is outputted, software control blocks indicate that no further stored data segments are available for outputting. In such case, the output port indicates a discontinuance of its output function by providing a first signal to the input port. The input port responds by updating the software control blocks when newly arrived and stored data segments reach a second control count value, the updating occurring irrespective of whether the determined quantity of the received data has been stored in memory. The input port then signals the output port to check the updated software control blocks and to resume outputting of the stored data segments. In such manner, intermediate updating of the software control blocks occurs only when a "data starved" condition is signalled by the output port and, at other times, occurs only when the predetermined amounts of data are received.

DETAILED DESCRIPTION OF THE INVENTION

PIPELINING OPERATION (GENERAL)

The invention to be described below is configured in the form of a multi-nodal system which implements a disk drive array. Inputs and outputs from the respective disk drives are fed through a cache node (buffer) wherein pipelining of data transfers is implemented. Input and output ports to the cache node operate substantially independently and in an asynchronous manner. However, the ports are loosely coupled by plural control lines whose signal potential enable the pipelining action. When a request is received by the disk drive array from a host processor to access stored data, that data is read from disk and written to a cache node. The accessing operation retrieves not only the specifically requested data, but also an entire logical track which includes the requested data. This action occurs based upon the assumption that when one record from a logical track is requested, it is highly likely that additional records will be requested from the same logical track. A logical disk track may include multiple physical tracks on disk and thus enables records of indeterminate length to be read from and written to disk.

When the data is read from disk, it is written to a cache node's hardware input port and as soon as a small quantity of data from the logical track is stored in the cache node, a hardware output port in the cache node is signalled to commence outputting the stored data to the requesting host processor.

The hardware output port determines where and what the data is that is to be transferred by reference to software control blocks. Normally, the software control blocks are only intermittently updated to conserve processing time. As a result, the software control blocks do not always indicate the current state of data in the buffers within the cache node. Should the hardware output port transfer data to the host processor at a rate which outruns the availability of software control block-indicated available data in the buffers, a "data starved" condition occurs, which condition is signalled by the hardware output port to the hardware input port of the cache node. If the hardware input port, in response to receiving the data starved indication, has received additional data from a disk track, the hardware output port is instructed not to disconnect from its output data link and to recheck software control blocks which indicate the data stored in the buffers. Concurrently, the software control blocks are updated to reflect the additional received data. It is to be noted that the software control blocks, except in a data starved condition, are not updated except when sufficient data is received to complete storage of an entire record in a buffer or the when storage capacity of a buffer is filled. By avoiding intermediate updates—except in the case of data starved situations—substantial processing economies are achieved.

In the event the hardware input port has not received sufficient data to instruct the hardware output port to commence retransmission of data, the hardware output port is instructed to disconnect and to await a further signal from the hardware input port. That further signal is manifest when, at some later time, sufficient data is received to recommence data transmissions. Upon a disconnection, the hardware output port is free to proceed to another data transfer command and to commence operations with respect thereto.

Hereafter, the nodal array and node structures which implement the invention will be described with reference to FIGS. 1 and 2. The hardware and software control data structures required to implement the invention will be described with reference to FIG. 3 and the overall operation of the invention will be described in relation to FIGS. 4–6.

NODAL ARRAY AND NODE STRUCTURES

Figure 1:
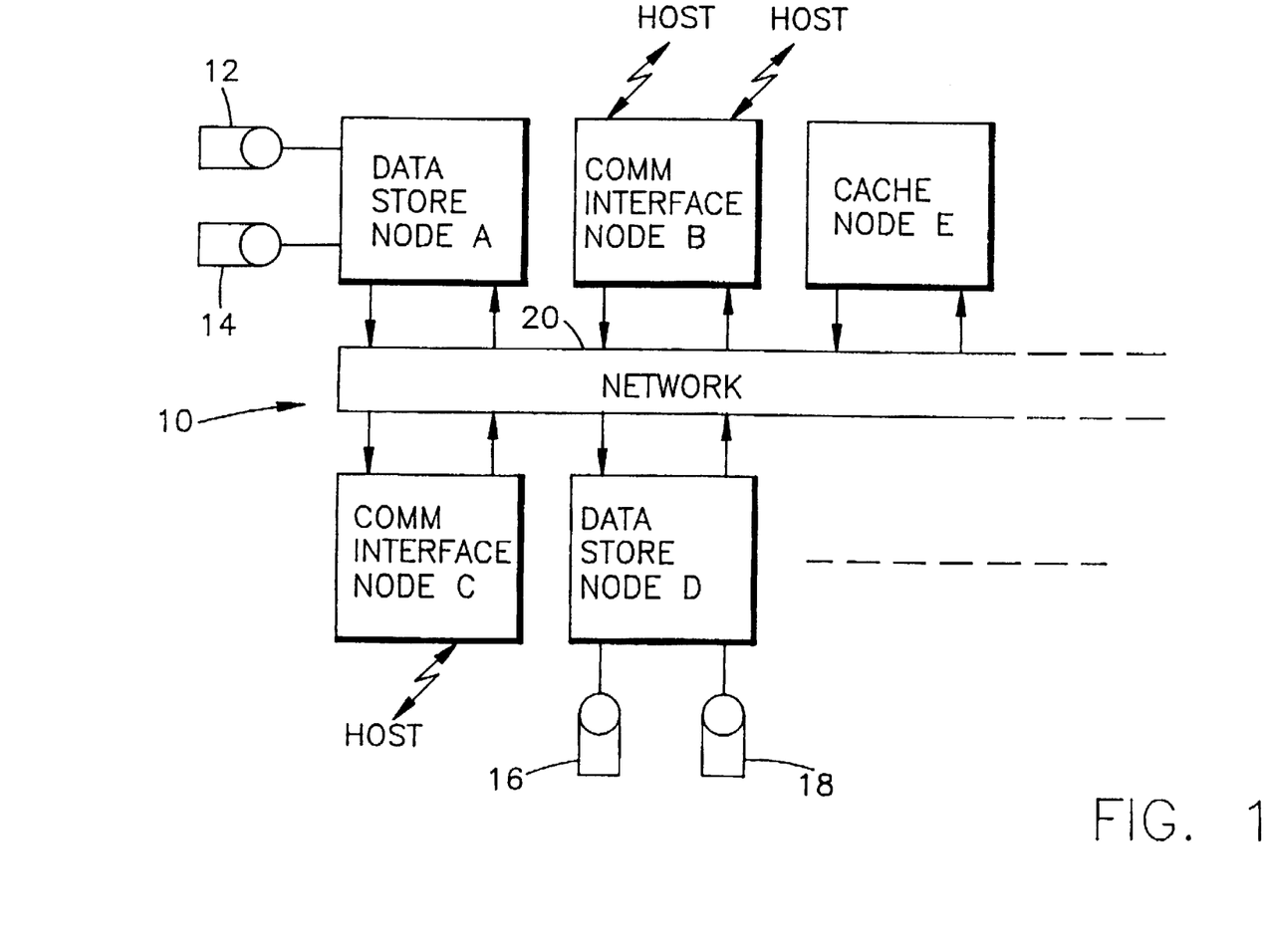
FIG. 1 is a block diagram illustrating a nodal disk array which provides storage functions for a host processor.

FIG. 1 illustrates a disk drive array 10 configured, for example, as a multi-node network. Nodes A and D are data storage nodes that connect to coupled disk drive 12, 14 and 16, 18, respectively. While only four disk drives are shown, one skilled in the art will realize that disk drive array 10 will include many more disk drives. A pair of communication interface nodes B and C provide input/output communication functions for disk drive array 10. Host processors are coupled to nodes B and C via communication links. Disk drive array 10 is expandable by addition of further nodes, all of which are interconnected to communication network 20.

A cache node E is employed to perform a buffer function for data reads from a disk drive, prior to transmission to a host processor by a communication interface node. Similarly, cache node E provides a buffering function for data transmitted from a host processor that is to be written to disk in array 10. Cache node E, and its resident processor implement the pipelining invention to be described below.

Figure 2:
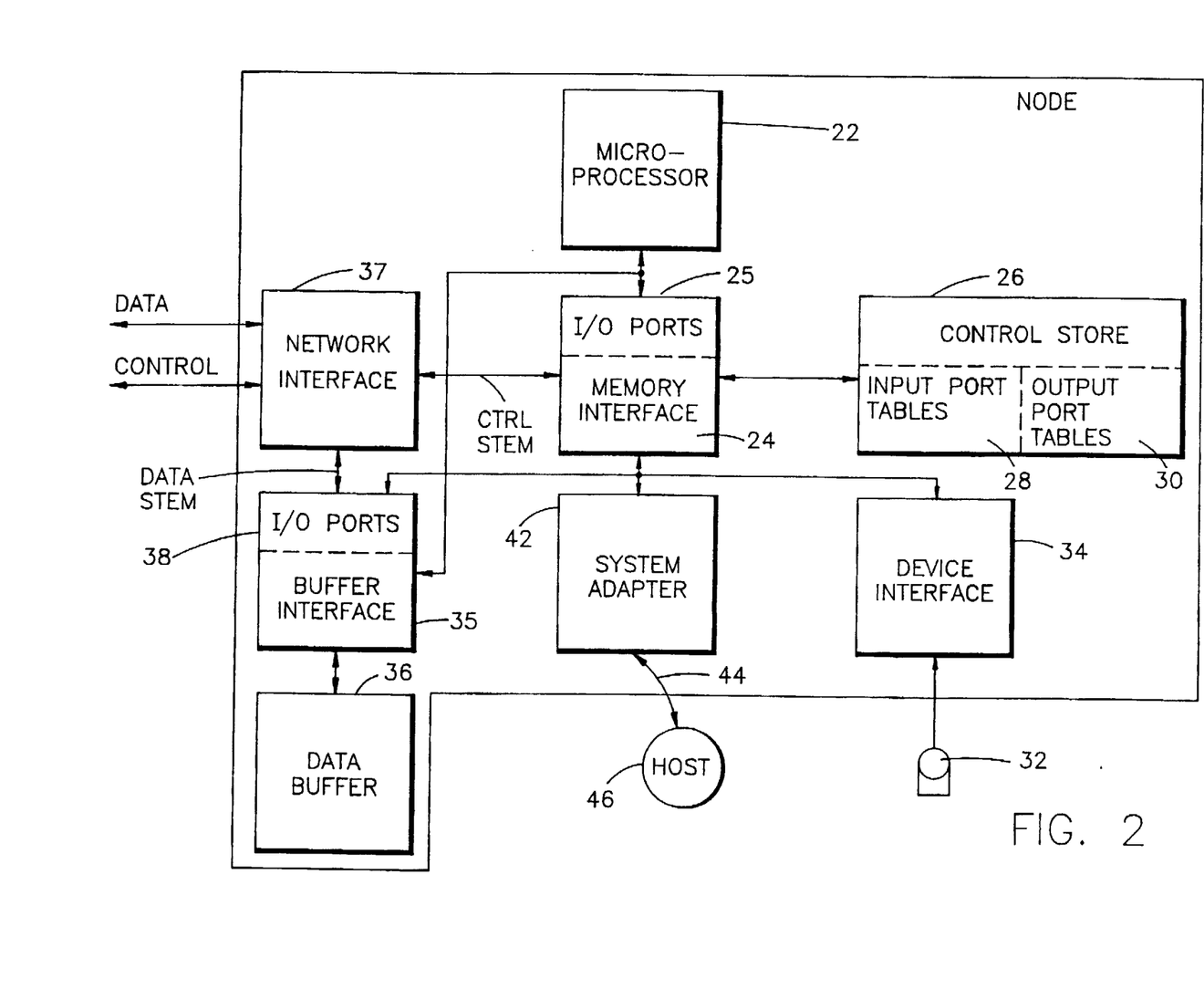
FIG. 2 is a block diagram of an exemplary node in the system of FIG. 1, the exemplary node incorporating the invention.

Each of nodes A–E in FIG. 1 is configured in a standard node arrangement shown in FIG. 2. A node includes a microprocessor 22 that controls the overall functions of the node. A memory interface module 24 controls communications between microprocessor 22 and plural memory modules within the node. Memory interface module 24 also includes input/output hardware 25 for handling of control messages. Control messages are stored in a connected control store 26 which also contains code that controls the operation of microprocessor 22. Among other control code contained within control store 26 is an input port table 28 and an output port table 30. As will become apparent from the description below, a node includes many logical input/output ports, and an input port table 28 and an output port table 30 are provided for each physical input/output port. Each entry in those tables corresponds to a logical input/output port.

The node of FIG. 2 includes plural disk drives 32 (only one is shown) that are connected via device interfaces 34 to memory interface 24 and a data buffer interface 35. Data buffer interface 35 connects a data buffer 36 to a network interface 37. Data buffer 36 provides buffering functions for both incoming and outgoing data messages (as contrasted to control messages). Data buffer interface 35 further includes input/output hardware ports 38 for handling of received data. Input/output hardware ports 38 in data buffer interface 35 and input/output hardware ports 25 in memory interface 24 are controlled by entries in input port tables 28 and output port tables 30 in control store 26. Network interface 37 provides interface functions for both incoming and outgoing message transfers.

If the node of FIG. 2 is configured as a data storage node, it will include plural disk drives 32. If the node is configured as a communications interface node, it will include a system adapter 42 which enables interconnection and communications with a host processor 46. If the node is configured as a cache node, data received during a read action from disk in another node is temporarily stored in data buffer 36. Data buffer 36 is segmented into various size buffers to store and hold the received data for subsequent transfer via network interface 37 to a communication interface node and thence to a host processor.

Operations within the node are controlled by software generated control blocks. Those control blocks are created by software running in microprocessor 22 in response to control messages received prior to an actual data transfer. Those control messages enable the node of FIG. 2 to know what data will be received, how much data is involved, where the data is to be transmitted, etc., etc. Upon receiving that information, microprocessor 22, in concert with control software in control store 26, constructs plural software control blocks to enable the hardware within the node to accomplish a data buffering action. For any input or output action, the software assigns plural control blocks and each control block includes at least one parameter required to enable set up of a hardware facility which is required during the overall caching action.

Control blocks may be "chained" so that one control block includes a pointer to a next control block that is involved in the same data processing action. Certain control blocks indicate an action that enables: assembly of an outgoing data stream, identification of where the data is to be found, a designation of its structure, identification of specific buffers that have been predesignated to hold data that comprises the outgoing data, etc. As is known to those skilled in the art, buffer areas in data buffer 40 are segmented in advance so as to enable a most efficient use of memory space while enabling specific segments to be accessed independently of other segments.

SOFTWARE CONTROL BLOCK DATA STRUCTURES

Figure 3:
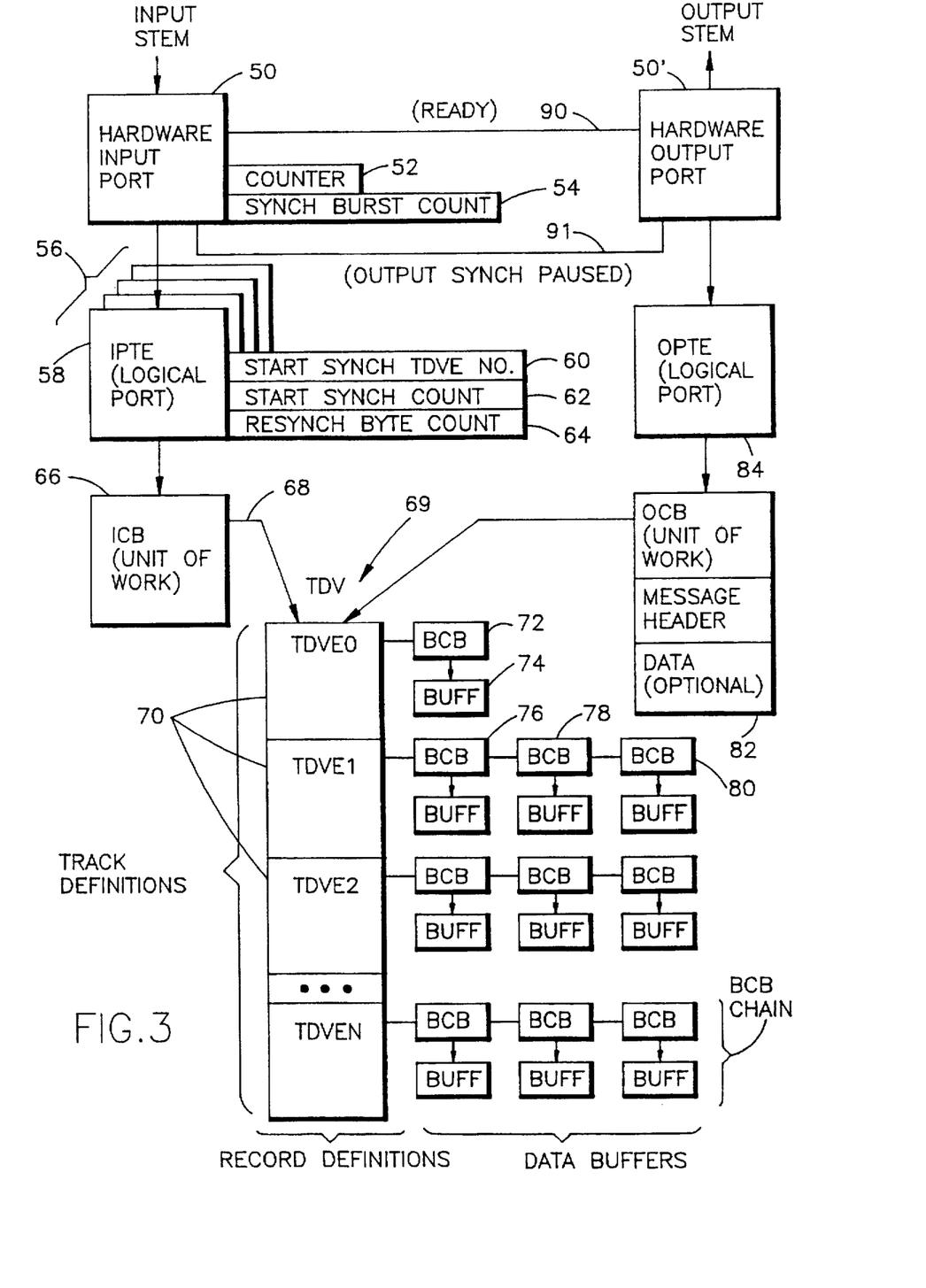
FIG. 3 is a diagram showing hardware and software control blocks that enable messages to be complied, stored in a buffer and then transmitted to another node.

In FIG. 3, a combined hardware/software block diagram illustrates major control structures present within a node. Those control structures enable both data inputs and data outputs to be accomplished in a cache node on a pipelined basis. A cache node (e.g. cache node E of FIG. 1) includes input and output stems that are employed to handle incoming and outgoing data, respectively. The input stem includes a hardware input port 50 which is matched by an equivalent hardware output port 50'. For control messages, these hardware ports reside in memory interface 24 (FIG. 2) and for data messages the hardware ports reside in buffer interface 35.

A hardware input port 50 is a physical entity that is used to manage processing and storage in-bound messages to the cache node. Both hardware input port 50 and hardware output port 50' include sets of associated hardware registers which receive control data from control blocks to be hereafter described. Two registers associated with hardware input port 50 are used to implement the pipeline function. Those registers are counter register 52 and synch burst count register 54.

Counter register 52 is set, at various times during the pipeline operation, to manifest a count number of received input bytes. Synch burst length register 54 is programmable and is set to a value equal to a number of received input bytes. That value determines when a "bytes in buffer" entry in a buffer control block (to be described below) should be updated to enable further pipeline action.

When all requisite control data is inserted into registers in both hardware input port 50 and hardware output port 50', a caching/pipeline action can be accomplished using the control data present in the registers.

Hardware input port 50 is associated with an input port table 56 that lists many logical input ports. A logical input port is assigned to handle an incoming message and is represented by an input port table entry (IPTE) 58, a portion of whose data structure is shown in Table 1 below.

TABLE 1

| INPUT PORT TABLE ENTRY (IPTE) |
|---|
| - FIRST ICB |
| - LAST ICB |
| - FLAGS: ENABLE PIPELINE |
| - TAG 1 |
| - POINTER TO OUTPUT HARDWARE PORT |
| - POINTER TO OUTPUT LOGICAL PORT |
| - START SYNCH TDVE NUMBER |
| - START SYNCH COUNT |
| - RESYNCH BYTE COUNT |

An IPTE 58 includes a designation of a first input control block (ICB) required to commence a storage action for a message received from elsewhere in array 10. An ICB defines a message and a specific action to taken with respect to the message and will be described in detail below. IPTE 58 further includes a designation of the last input control block (ICB) that terminates the storage action. Intermediate ICBs are determined by chaining values contained within the individual ICBs. All control blocks chained from an ICB defines where data comprising the message is to be stored, etc.

An IPTE 58 further includes flags which define various interrupt conditions, status states, response states, etc. One of those flags indicates enablement of the pipeline action and must be set ON to allow performance of the pipeline function. An IPTE 58 further include a "tag one" value which enables detection of chaining faults during operation of the data processing action and pointers to both output hardware port 50' and a logical output port which corresponds to the logical input port. The pointer to the output logical port indicates the output logical port to be placed on a ready queue in hardware output port 50' during the pipelining action.

IPTE 58 further includes three additional entries that are instrumental in the performance of a pipeline action: a Start Synch TDVE number, a Start Synch Count value, and a Resynch Byte Count value. Those entries are shown in FIG. 3 by blocks 60, 62, and 64, respectively. The Start Synch TDVE Number identifies a track descriptor vector element (to be described below), which defines a record on disk from which data is to be read during the pipelining action. The Start Synch Count is a number of bytes which hardware input port 50 must receive before transmission can commence of a received message portion by hardware output port 50'. The Resynch Byte Count is a value which specifies a number of bytes which hardware input port 50 must receive (in a "data starved" situation) before further pipeline action can commence. The Resynch Byte Count comes into play only after hardware output port 50' has signalled a data starved condition and has been disconnected due to a lack of message data to transmit.

Prior to receipt of a record or records from a disk drive read action, control signals are transmitted which enable microprocessor 22 to establish a series of ICBs 66 that enable execution of the required caching action. The data structure of relevant entries in an ICB is shown in Table 2 below.

TABLE 2

| INPUT CONTROL BLOCK (ICB) |
|---|
| - NEXT ICB POINTER |
| - FLAGS |

TABLE 2-continued

| INPUT CONTROL BLOCK (ICB) |
| --- |
| - TAG 1 |
| - SECTOR LENGTH |
| - SECTOR COUNT |
| - START TDVE |
| - END TDVE |

Each ICB 66 defines a message and includes a next ICB pointer which is an address value of a next ICB data structure. It is the next ICB pointer value which accomplishes a chaining action between ICBs. The pointer to the first ICB, as above indicated, is contained in an IPTE 58. When the first ICB is accessed through the use of that pointer, all ICBs associated with the caching action can then be determined by succeeding ICB pointers in succeeding chained ICBs.

An ICB defines, by various flags contained within it, a particular data processing action to be performed and further includes information that defines a logical track length, i.e., sector length, sector count, and a "track descriptor vector" pointer (TDV) 68 (see FIG. 3). A TDV is a table which includes track descriptor vector elements 70 that are control blocks which further describe records that are to be cached. A TDVE 70 is a fixed format description of a record on a disk track. As indicated above, a logical track may include a plurality of records and, each record being defined by a different TDVE 70.

In addition to a Start TDVE pointer, an ICB also includes an End TDVE pointer so that all records required for the data caching action are identified by data within or accessible from the ICB. Further control data is present in an ICB but is not relevant to the invention described herein.

A TDVE data structure is illustrated in Table 3 below:

TABLE 3

| TRACK DESCRIPTOR VECTOR ELEMENT (TDVE) |
| --- |
| - FIELD 1 DATA ID (e.g. COUNT) |
| - FIELD 2 LENGTH (e.g. KEY) |
| - FIELD 3 LENGTH (e.g. DATA) |
| - FLAGS: RECORD STATUS |
|     (00 = NO DATA IN TDVE) |
|     (01 = END OF RECORD IN TDVE) |
|     (10 = START OF RECORD IN TDVE) |
|     (11 - COMPLETE RECORD IN TDVE) |
| - FIRST BCB |
| - TAG 1 |
| - TAG 2 |
| - RECORD NO |

Assuming that records on a disk track are arranged using the known "Count, Key, Data" arrangement, a TDVE data structure will include field descriptors for each of the Count, Key, and Data fields. The Count key field will include the record count number that occurs in field 1 of the record; the Field 2 value will include the length of the record name (i.e., the Key); and the Field 3 value will indicate the length of data in the data portion of the record. During data entry, microprocessor 22 (FIG. 2) will invariably update a TDVE (e.g. the field 3 value) when all data in the record has been written into buffer. At other times, the TDVE data structure is only updated when a data starved condition is manifest by hardware output port 50'. As with other control blocks, flags are included in a TDVE which define various interrupt states, control states, etc. The TDVE includes information regarding the record received by hardware input port 50 and written to buffer. To this end, four values may occur in the Record Status flag as follows: 00 means that no data has been received for the data record defined in the TDVE; 01 indicates that the end of record has been written to buffer (but possibly not the start of record); 10 means that the start of record has been written to buffer (but possibly not the end of record); and 11 means that the complete record has been written to buffer, including both a start of record and an end of record. The latter value indicates that hardware input port 50 has received all the data comprising the current TDVE.

A TDVE further includes a pointer to a first buffer control block (BCB) which is a data structure that includes control data to enable set up and identification of physical buffer space to be employed in the storage of the record defined by the TDVE. The TDVE also includes tag 1 and tag 2 values which enable subsequent control blocks to be identified as properly associated in the caching action.

A BCB data structure is shown in Table 4 below:

TABLE 4

| BUFFER CONTROL BLOCK |
| --- |
| - NEXT BCB POINTER |
| - DATA BYTES. IN BUFFER |
| - TAG ½ |
| - BUFFER SIZE |
| - FLAGS: BUFFER COMPLETE INDICATOR |
| - BUFFER ADDRESS |

A BCB 72 data structure (FIG. 3) includes a pointer to a next BCB, it being realized that plural buffer locations may be allocated to a data caching action. For instance, assume that ICB 66 (FIG. 3) includes a pointer to TDV table 69 and, indirectly, to TDVE 0 which defines where a first record is to be stored in buffer memory. Recall that ICB 66 includes both a start TDVE pointer and an end TDVE pointer which, in the case shown in FIG. 3, is TDVE N. Each TDVE further includes a pointer to a BCB that defines the amount of buffer 74 required to store the data record. Other TDVEs (e.g. TDVE 1) may include a pointer to plural chained BCBs 76, 78, 80 which define buffer areas to be allocated to portions of the record defined by TDVE 1.

Returning to Table 4, each BCB includes a next BCB pointer that enables a chaining of BCBs. BCB data structure entry "Data Bytes in Buffer" indicates the number of data bytes stored in the physical buffer space and is updated when a flag in the BCB indicates "buffer complete". The "Data Bytes in Buffer" value is the data value which enables hardware port 50' to determine the presence of a data starved condition. Only in a data starved condition is an intermediate update performed on the "Data Bytes in Buffer" field (i.e. before the buffer complete flag is set). The buffer complete flag, when set, indicates that all necessary data, status and control information has been stored into the buffer associated with the BCB and no further data will be inserted thereinto.

A BCB data structure further includes tag 1 or tag 2 values for chaining control, and the address of the first buffer entry in the buffer memory.

Two additional control block structures are employed to complete the software control mechanisms employed to implement the invention. Those structures are an output control block (OCB) 82 and an output port table entry (OPTE) 84. Those control block data structures are illustrated in Tables 5 and 6 below and enable each unit of data accessed from a buffer to be provided to hardware output port 50'.

TABLE 5

OUTPUT CONTROL BLOCK (OCB)

- NEXT OCB POINTER
- START TDVE
- END TDVE
- FLAGS
- TAG 1
- DESTINATION ADDRESS
- LOGICAL INPUT PORT ADDRESS AT DESTINATION
- MESSAGE DATA (FOR CONTROL)

TABLE 6

OUTPUT PORT TABLE ENTRY (OPTE)

- START OF OCB CHAIN
- END OF OCB CHAIN
- FLAG: ENABLE PIPELINE
- NEXT OPTE
- POINTER TO INPUT PHYSICAL PORT
- POINTER TO INPUT LOGICAL PORT

An OCB 82 data structure includes a pointer to a next OCB and also includes a start TDVE pointer and an end TDVE pointer that enable identification and access of data stored in buffers, using BCB pointers contained in each pointed-to TDVE. As above described, an ICB is established when message data is to be received by the cache node and defines, for example, a data write action and where the ICB message data is to be written to buffer. By contrast an OCB is set up when a requirement for a data read action is received by the cache node and defines what data is to be read and where to find it (via other chained control blocks). In a caching action an entire record track may be received for storage in buffer, but only a portion of the track may be requested to be read. Thus the OCB enables independent access to record data stored in buffer, which record data has been stored under control of an ICB.

Various flags are also included in an OCB that define control and interrupt states. A tag 1 value entry enables, as before, association of OCB 82 with a particular series of control blocks assigned to a specific buffering action. An OCB further includes a destination address for the data and a logical input port address at the destination where the data is to be directed. Under certain circumstances, an OCB may also include a control message to Me transmitted to a destination address. Such an entry avoids the need to access a chained BCB to identify where the control message is stored.

Table 6 illustrates an OPTE 84 data structure which is substantially similar to IPTE data structure 58, but with reference to OCBs that are chained to provide outgoing data. OPTE 84 includes a pointer to a start of the OCB chain and a pointer to the end of the OCB chain. One of the flags included in an OPTE 84 is an "enable pipeline" flag that must be set to enable operation of the pipeline action. OPTE 84 also includes a pointer to a next OPTE so as to enable a chained series of OPTEs to control data fed to hardware output port 50'. Pointers are further included to the input physical port and the input logical port and are used to enable signals to be passed thereto in a pipeline action.

HARDWARE/SOFTWARE CONTROL OF PIPELINING

Figure 4:
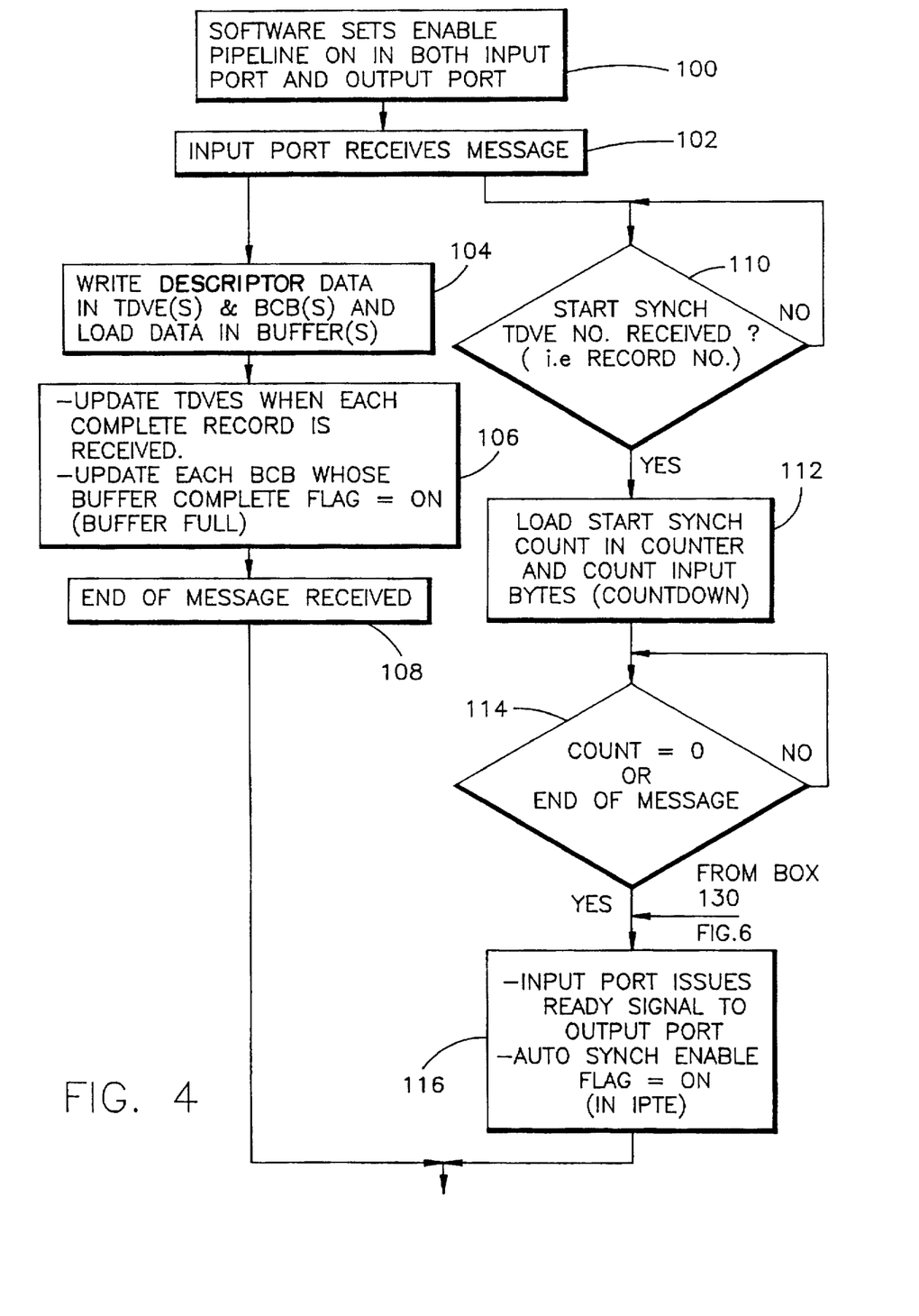
FIGS. 4–6 illustrate logical flow diagram which illustrates the pipelining action implemented by a cache node illustrated in FIGS. 1 and 2.
Figure 5:
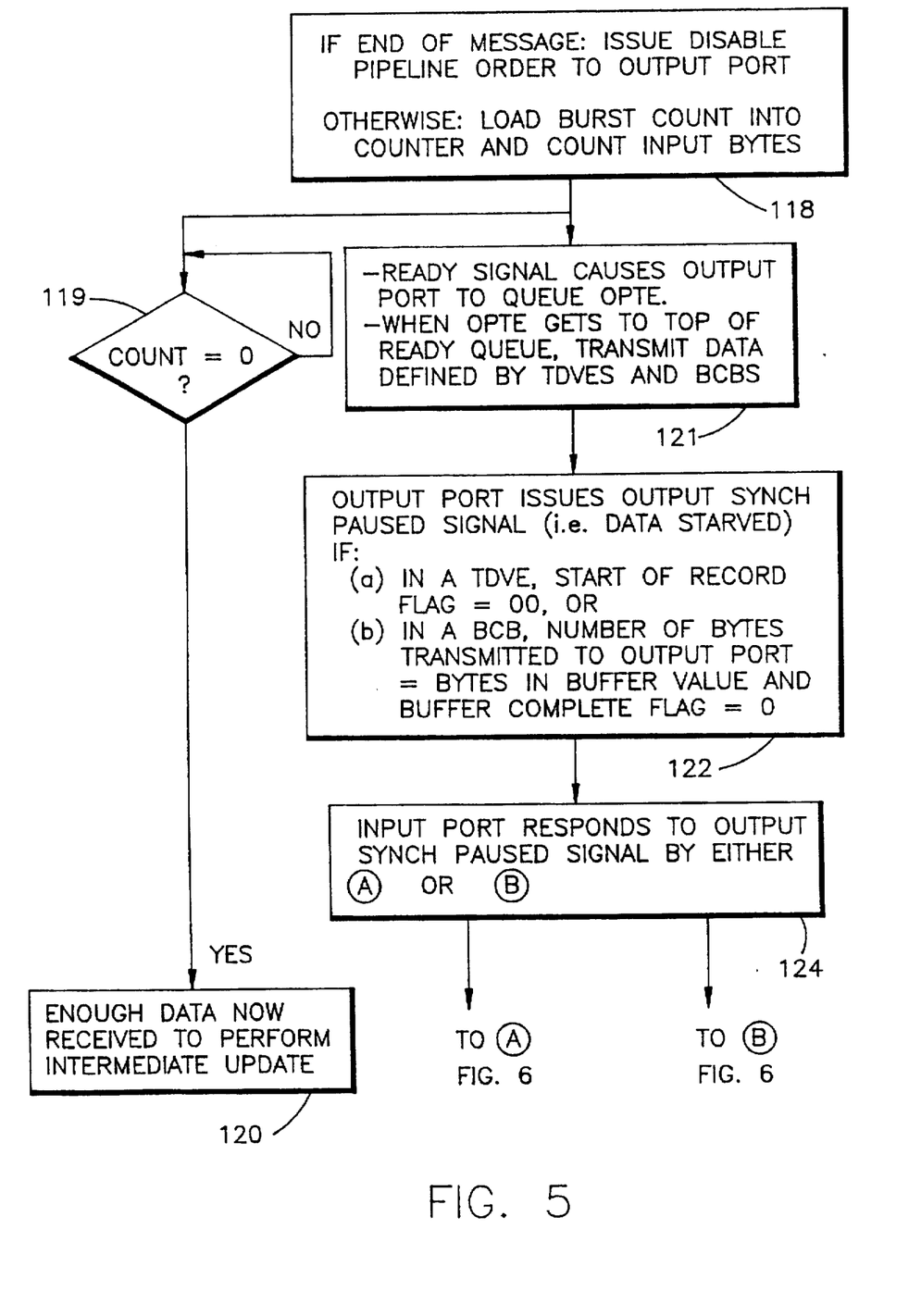
Figure 6:
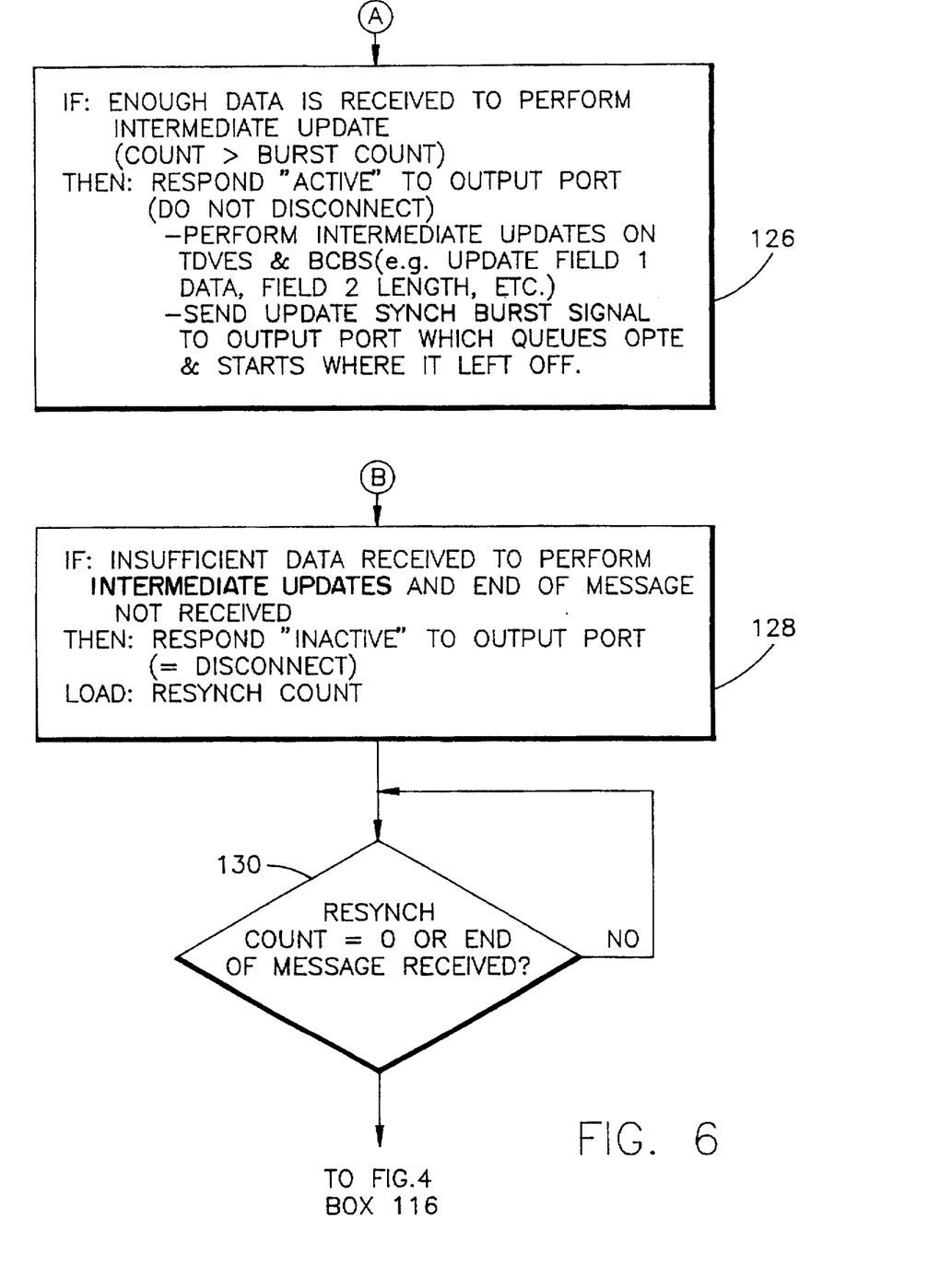

Referring now to FIGS. 4–6, a procedure will be described that is implemented by cache node E (FIG. 1) to implement a pipelining of data that is read into cache node E from disk drive storage node A and out of cache node E to a communication interface node. Initially, assume that software has set the "enable pipeline ON" flags in both IPTE 58 and OPTE 84 control blocks (Box 100). Further assume that software has configured all control blocks and that their entries are present in control block registers within hardware input port 50 and hardware output port 50'.

At this stage, transmission of messages from node A commences and hardware input port 50 in node E starts receiving the messages (box 102). If it is assumed that the data being read from disk includes "self descriptor" data (i.e. Count, Key, Data), that descriptor data is entered into the TDVEs and BCBs as the messages are received. The message data read from disk is written into buffers associated with the BCBs (box 104).

Each TDVE is updated when its "record status" flag indicates that a complete record is present in buffer. At such time, all BCBs associated with the TDVE are also updated, as no further data will be stored therein and their "data bytes in buffer" fields will thereafter not be modified. Each BCB is also updated when its buffer complete indicator is set ON (indicating that the associated buffer is full). These actions are illustrated in box 106. If an end of message signal is received (box 108), the procedure moves to box 118 to be described below.

In parallel with the aforedescribed actions, a register in hardware input port 50 has been loaded with data from IPTE 58 (FIG. 3). That data includes a Start Synch TDVE number which indicates the TDVE that will define a record for which a data transmission request has been received. As above indicated, hardware output port 50' is primed to transmit at least portions of the record that is defined by the Start Synch TDVE number 60 in IPTE 58. When the record number is received, hardware input port 50 causes counter 52 to be loaded with a Start Synch Count 62 from IPTE 58. That value is set by software and may be varied to enable more or less data bytes to be received before a pipelining action is commenced.

Hardware input port 50 now commences counting down from the Start Synch Count Value as input bytes are received (box 112). When the count in counter 52 has reached zero, or an end of message indication has been received (decision box 114), it is known that sufficient data has been received to commence a pipelined output of data from hardware output port 50'. If an end of message signal has been received, no further data will be incoming with respect to the required record and the procedure can commence the output action.

When counter 52 manifests a zero count, hardware input port 50 issues a "Ready" signal to hardware output port 50' via line 90 (FIG. 3) (box 116). It is assumed that the auto synch enable flag in IPTE 58 is ON. When that flag is OFF, no ready order is transmitted to hardware output port 50' The auto synch enable flag is used to enable the system to be "primed" and ready for a pipeline data transfer, before any data is received, but not to commence the pipeline action until actual data is received and an indication is received from software to set the auto synch enable flag ON.

As shown in box 118, if an end of message has been received, in addition to the Ready signal, a disable pipeline order is issued to output port 50', thereby enabling output port 50' to complete its data transmissions without concern for "data starvation" since all data that can be transmitted is already present in buffer.

If an end of message has not been received, a Synch Burst Length value 54 (stored in hardware input port 50) is loaded into counter 52 and message input bytes continue to be counted. The Synch Burst Length Value is a programmable value and controls when intermediate updates can be performed on TDVEs and associated BCBs. An intermediate update is one which occurs prior to completion of receipt of a full record in a TDVE or when a buffer complete flag is not set ON in an associated BCB. Such updating is "expensive" in terms of processing time and is to be avoided—except in the instance of data starvation at hardware output port 50'. To this end, counter 52, in parallel with other actions, continues its countdown as input bytes are received. When counter 52's count equals zero (decision box 119) it is known that sufficient data has now been received to perform an intermediate update, if such an update is required during performance of the pipeline action (box 120). If no data starvation situation is indicated, no intermediate update is performed.

When hardware output port 50' receives the Ready signal, it places OPTE 84 in its ready queue. When OPTE 84 reaches the top of the ready queue, hardware output port 50' employs the entries in OPTE 84 to access a pointed-to OCB, TDV and associated BCB(s) to determine the location of buffered data to be transmitted. Transmission then commences of the buffered data (box 121). During this time, hardware input port 50 is still continuing to receive input data and to store it in accordance with preset control block data structures. Hardware input port 50 also updates the BCB's as their associates buffers are filled and TDVEs, as each complete record is received.

Hardware output port 50' may become "data starved" during its transmission of data. That condition is manifest when hardware output port 50' accesses all data bytes from a buffer that are indicated as being present in the buffer by the BCB associated with the buffer. At such time (box 122), hardware output port 50' issues an "output synch paused" signal to hardware input port 50 via line 90 as an indication of the data starved condition. As shown in box 122, the output synch paused signal is issued if: in an accessed TDVE, the start of record flag equals 00 indicating that no data has been received from a record indicated by the TDVE;.or if, in a BCB, the number of bytes transmitted to hardware output port 50' is equal to the "bytes in buffer" value and the buffer complete flag is not set.

When hardware input port 50 receives the output synch paused signal, its response is determined by the state of counter 52 which indicates whether sufficient data has been received to perform an intermediate update (box 120). This state is indicated by counter 52 manifesting a 0 value, indicating that its count is at least equal to the previously entered Synch Burst Count. This action is illustrated in box 124 in FIG. 5. If sufficient data has been received and stored to enable an intermediate update of TDVEs and BCBs, then hardware input port 50 provides an "active" signal response on line 90 to hardware output port 50' which instructs hardware output port 50' not to disconnect from its output communication link (box 126).

Thereafter, intermediate updates are performed on the TDVEs and BCBs to revise the fields which evidence amounts of data received. For instance, the "bytes in buffer" entry in each BCB is updated to indicate the current byte counts in the associated buffers. After the intermediate updates have been accomplished, an "update synch burst" signal is transmitted by hardware input port 50 via line 90 to hardware output port 50' which responds by proceeding to queue OPTE 84 and to continue accessing of TDVE and BCB data, where it left off when the data starved condition occurred.

If, when the output synch paused signal is received by hardware input port 50, counter 52 has not yet counted down to 0 (from the burst count value), then insufficient data has been received to enable an intermediate update (or an end of message has not been received). In such a condition, hardware input port 50 transmits an "inactive" signal to hardware output port 50' (box 128). In response, hardware output port 50' disconnects from its output communication link and proceeds to handle another data transmission task. At the same time, hardware input port 50 loads counter 52 with a Resynch Byte Count value 64 from IPTE 58. Hardware input port 50 then decrements counter 52 from the Resynch Byte Count value as further data bytes are received of the message wherein a data starved condition occurred.

Until counter 52 counts down to zero (decision box 130), or an end of message is received, the procedure simply waits. When either condition occurs, the procedure recycles back to box 116 (FIG. 4) and a Ready Signal is issued to hardware output port 50' indicating that sufficient data is now available to recommence transmission of data from the previously interrupted message. The procedure then recycles until an end of message is received, at which point, the enable pipeline action is disabled and the remaining data transmitted in a standard mode.

As can been seen from the above description, the pipelining action implemented by the invention is operable with plural buffers and functions so as to avoid intermediate updates of control block structures, except in the case of a data starved condition. Highly efficient data transmissions, of a pipelined nature are enabled to continue until data transfers are complete.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A system for enabling pipelining of data to and from a memory, said system comprising:

memory status means for indicating amounts of data stored in said memory;

input means for receiving and storing data segments of received data in said memory, said input means automatically updating memory indications manifested by said memory status means when a determined quantity of said data segments are stored in said memory;

count means for manifesting control count values;

output means responsive to a requirement to output at least a required portion of said received data and to a signal from said input means that stored data segments of said received data at least equal a first control count value of said count means, for outputting said stored data segments from said memory, and for discontinuing outputting of said stored data segments if, before said required portion of received data is outputted, said memory status means indicates no further stored data segments are available for outputting, and for indicating said discontinuing action by a first signal to said input means;

said input means responding to said first signal by updating said memory status means when stored data segments reach a second control count value, said updating occurring irrespective of whether said determined quantity of received data is stored in memory, and signalling said output means to resume outputting said stored data segments.

2. The system as recited in claim 1, wherein said output means is only enabled to output stored data segments when said memory status means indicates that stored data segments are available for outputting.

3. The system as recited in claim 2, wherein said input means, in response to said first signal from said output means and when said stored data segments equal said second control count value, provides a second signal to said output means which causes said output means to remain connected to an output data link and to remain ready to output data segments.

4. The system as recited in claim 3, wherein said input means, in response to said first signal from said output means when said stored data segments do not reach said second control count value, provides a third signal to said output means which causes said output means to disconnect from said output link and to stand by for transmission of other data.

5. The system as recited in claim 4, wherein, subsequent to issuance of said second signal, said input means is responsive to said stored data segments of received data at least equalling a third control count value, to provide a fourth signal to said output means, said fourth signal causing said output means to reconnect to said output data link and to commence transmitting of said stored data segments of received data whose transmission was discontinued, which discontinuation resulted in generation of said first signal to said input means.

6. The system as recited in claim 1, wherein said memory status means comprises plural software control blocks that include track descriptor data and buffer content data, respectively, said track descriptor data indicating whether or not a full record of said received data is present in said memory and whether or not said buffer content data indicates a full status of assigned buffer storage areas in said memory.

7. The system as recited in claim 6 wherein said software control blocks are updated to evidence current track descriptor data and buffer content data, respectively, when a full record has been received and stored or when a buffer is filled, or when said output means manifests said first signal to said input means and when stored data segments reach said second control count value.

8. The system as recited in claim 7, wherein plural software control blocks that manifest buffer content data are chained to indicate different regions of memory that have been allocated for use as buffer storage areas, said output means employing buffer content data in said software control blocks to determine availability of stored data segments for transmission, as each buffer storage area is accessed for stored data segments.

9. The system as recited in claim 5, wherein said first control count value, said second control count value and third control count value are individually programmable to enable user adjustment of conditions which cause enablement of said pipelining of data.

10. A method for enabling pipelining of data to and from a memory in a processing node, said node including memory status means for indicating amounts of data stored in said memory and count means for manifesting control count values, said method comprising the steps of:

receiving and storing data segments of received data in said memory;

updating memory indications manifest by said memory status means when determined quantities of said data segments are stored in said memory;

outputting stored data segments from said memory means in response to a requirement to output at least a required portion of said received data and to a signal that stored data segments of said received data at least equal a first control count of said count means;

discontinuing outputting of said stored data segments if, before said required portion of received data is outputted, said memory status means indicates no further stored data segments are available for outputting, and indicating said discontinuing action by a first signal;

responding to said first signal by updating said memory status means when stored data segments reach a second control count value, said updating occurring irrespective of whether said determined quantities of received data are stored in memory; and resuming outputting of stored data segments.

11. The method as recited in claim 10, further comprising the step of:

providing a second signal to said output means which causes said output means to remain connected to an output data link and to remain ready to output data segments, said second signal provided after said first signal from said output means and when said stored data segments equal said second control count value.

12. The method as recited in claim 11, further comprising the step of:

providing a third signal to said output means which causes said output means to disconnect from said output link and to stand by for transmission of other data, said third signal provided after said first signal and when said stored data segments do not reach said second control count value.

13. The method as recited in claim 12, further comprising the step of:

providing a fourth signal to said output means to cause said output means to reconnect to said output data link and to commence transmitting of said stored data segments of received data whose transmission was discontinued and which discontinuation resulted in generation of said first signal to said input means, said fourth signal provided after said second signal, and stored data segments of received data at least equal a third control count value.

14. The method as recited in claim 10 wherein said software control blocks employed to control said processing node are updated to evidence current track descriptor data and buffer content data, respectively, when a full record has been received and stored or when a buffer is filled, or after said first signal and when stored data segments reach said second control count value.

* * * * *